(12) United States Patent
Russell

(10) Patent No.: US 6,728,639 B2
(45) Date of Patent: Apr. 27, 2004

(54) METHOD AND APPARATUS FOR DETERMINING THE ORIENTATION OF A BOREHOLE

(75) Inventor: Michael Russell, Cheltenham (GB)

(73) Assignee: Smart Stabilizer Systems Limited, Gloucestershire (GB)

( * ) Notice: Subject to any disclaimer, the term of this patent is extended or adjusted under 35 U.S.C. 154(b) by 101 days.

(21) Appl. No.: 09/931,332

(22) Filed: Aug. 16, 2001

(65) Prior Publication Data
US 2002/0059734 A1 May 23, 2002

(30) Foreign Application Priority Data

Aug. 18, 2000 (GB) ................................. 0020364

(51) Int. Cl.$^7$ ................................. G01V 3/18
(52) U.S. Cl. ................................. 702/6; 702/9
(58) Field of Search ................................. 702/6–10; 367/82; 340/853.8, 854.4, 855.4; 324/338; 175/45

(56) References Cited

U.S. PATENT DOCUMENTS

| 5,128,867 A | | 7/1992 | Helm | 364/422 |
| 5,200,705 A | * | 4/1993 | Clark et al. | 324/338 |
| 5,230,387 A | * | 7/1993 | Waters et al. | 175/45 |
| 5,432,699 A | * | 7/1995 | Hache et al. | 702/9 |
| 5,435,069 A | * | 7/1995 | Nicholson | 33/304 |
| 5,812,068 A | * | 9/1998 | Wisler et al. | 340/855.5 |
| 6,315,062 B1 | * | 11/2001 | Alft et al. | 175/45 |
| 6,438,495 B1 | * | 8/2002 | Chau et al. | 702/9 |
| 6,480,119 B1 | * | 11/2002 | McElhinney | 340/853.8 |

FOREIGN PATENT DOCUMENTS

| EP | 0 193 230 | 9/1986 |
| EP | 0 653 647 A2 | 5/1995 |
| GB | 2 138 141 A | 10/1984 |
| GB | 2 205 166 A | 11/1988 |
| GB | 2 205 954 A | 12/1988 |
| GB | 2 225 118 A | 5/1990 |
| WO | 94/16196 | 7/1994 |

* cited by examiner

Primary Examiner—Marc S. Hoff
Assistant Examiner—Anthony Gutierrez
(74) Attorney, Agent, or Firm—Drinker Biddle & Reath LLP

(57) ABSTRACT

Borehole orientation information, typically azimuth and inclination, is derived from measurements of gravitational and magnetic components along a borehole axis (O) and transverse thereto. The transverse components are measured by a fluxgate (12) and accelerometer (14) arranged to rotate around the borehole axis (O) at a constant angular velocity (w). The calculations necessary to derive the desired parameters are detailed.

15 Claims, 4 Drawing Sheets

METHOD AND APPARATUS FOR DETERMINING THE ORIENTATION OF A BOREHOLE

FIELD OF THE INVENTION

This invention relates to a method and apparatus for use in surveying boreholes.

BACKGROUND TO THE INVENTION

In the field of offshore oil drilling, considerations of maximising recovery and reducing costs have led to the extensive use of highly deviated drilling which will typically seek to follow thin, generally horizontal oil bearing strata. This has caused a requirement for increasingly sophisticated downhole instrumentation to be included in the drill string, both for borehole logging and for navigational purposes.

In addition to the present position of the drill bit, the driller has a need to know the present orientation of the far end of the drill string in relation to the earth. This is conventionally presented as Inclination (INC) and Azimuth (AZ) plus the rotational steering angles Highside (HS) and Magnetic Steering Angle (MS).

It is known to derive these measurement from an instrument package which has a set of three mutually perpendicular accelerometers and a set of three mutually perpendicular magnetic fluxgates. These provide respectively the gravity component set [Gx, Gy, Gz] and the magnetic flux component set [Bx, By, Bz] referenced to the instrument axis OZ aligned with the local borehole axis. The survey angles INC, AZ, HS and MS can then be derived by calculation from the two vector component sets.

However, the known technique requires the vector component to be measured with the drill string stationary. This is inconvenient, both in requiring cessation of drilling with attendant lost time, and in that the driller has no real time information while drilling.

SUMMARY OF THE INVENTION

An object of the present invention is accordingly to provide a method and apparatus which enable borehole survey data to be produced while the drill string is rotating.

The present invention, in one aspect, provides a method of determining the orientation of a borehole in which at least one parameter selected from gravity and magnetic flux is measured; the method comprising passing a sensor assembly along the borehole; rotating the sensor assembly; deriving from the sensor assembly, for the or each selected parameter, measurements of a first parameter component along the borehole axis and a second parameter component along an axis which is transverse to the borehole axis and rotates thereabout with rotation of the sensor assembly; and calculating, for the or each selected parameter, from the first and second parameter components the value of one or more desired orientation angles.

From another aspect, the present invention provides apparatus for determining the orientation of a borehole, comprising a sensor assembly adapted to be incorporated in a rotating drill string; the sensor assembly being capable of measuring at least one parameter selected from gravity and magnetic flux; the sensor assembly comprising, for the or each selected parameter, a first sensor having a detection axis arranged along the axis of the drill string for measuring an axial component of the parameter to provide an axial component signal, and a second sensor having a detection axis arranged transversely to the drill string axis for measuring a transverse parameter component in a direction which, in use, rotates with the drill string to provide a transverse component signal; and means for calculating from said component signals the value of one or more desired orientation angles.

Preferably, both parameters (gravity and magnetic flux) are measured, and the orientation angles produced are azimuth and inclination. The local magnetic dip angle may also be calculated. The transverse component is preferably radial, but could be at some angle other than 90° to the borehole axis.

The calculation preferably comprises deriving for each revolution of the sensor assembly a train of a given number of equally spaced pulses, and using said pulse train to control integration of one or both of the gravity and magnetic flux signals over successive portions of each revolution, said portions preferably being quarter revolutions.

The integration may suitably be used to produce a set of simultaneous equations which are solved to derive the orientation angles.

DESCRIPTION OF PREFERRED EMBODIMENT

An embodiment of the invention will now be described, by way of example only, with reference to the drawings, in which.

Figure 1:
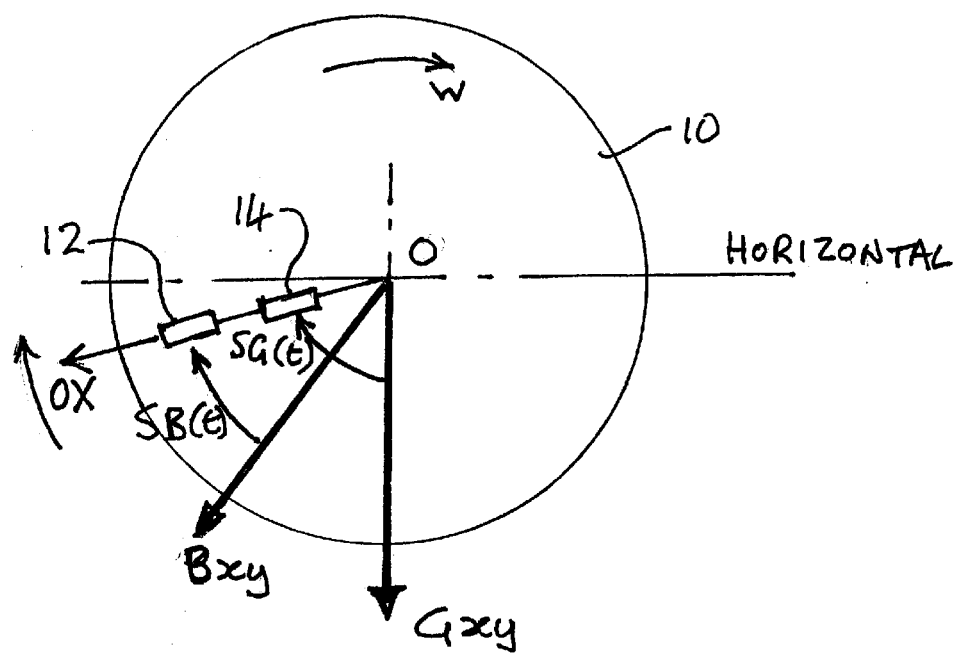
FIG. 1 is a diagrammatic cross-section of a drill string used in an embodiment of the invention.
Figure 2:
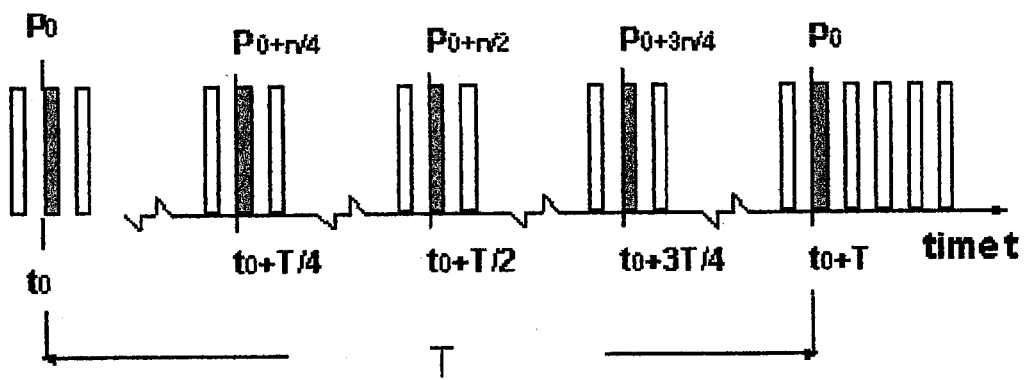
FIG. 2 depicts a control pulse train derived from the apparatus of FIG. 1.

Referring to FIG. 1, a drill string 10 is provided with a magnetic fluxgate (not shown) and an accelerometer (not shown) with their sensing axes arranged along the longitudinal axis OZ of the drill string. A magnetic fluxgate 12 and an accelerometer 14 have their sensing axes arranged along a radius of the drill string, said radius being referenced herein as OX which axis rotates with the drill string 10. These four sensors yield the gravity component set [Gx(t), Gz(t)] and the magnetic flux component set [Bx(t), Bz(t)] at time t.

This information is then processed to produce the desired parameters as will now be described. The processing, as will be apparent to those in the art, may be effected by well known electronic circuits or by computer, and may be carried out within the downhole instrument package or at the surface.

1. Gravity and Magnetic Sensors Outputs

With reference to FIG. 1, if the Angular Velocity of the drill string is W and time t=0 when the sensors axis (OX) lies along the direction of the cross-axis Gravity Component {Gxy}, then at any subsequent time t the gravity rotation angle is $$SG(t)=W.t$$

and the component of {Gxy} along the sensor (accelerometer) axis (OX) is $$Gx=Gxy.\cos(SG(t))=Gxy.\cos(W.t)$$

Thus the Accelerometer Output at time t can be written as $$Vgx(t)=Vg.\cos(W.t)+Vgk$$

where Vgk is a constant term provided that W is constant, and

Vg=Gxy.SFG where SFG is the accelerometer scale factor (volts/g).

Similarly, the Magnetic Fluxgate Output can be written as $$Vbx(t)=Vb.\cos(W.t)+Vbk$$

with Vb=Bxy.SFB where SFB is the Fluxgate Scale Factor (Volts/tesla).

2. Integration Control Pulse-train

The output from either the accelerometer or the fluxgate can be used with appropriate circuitry to generate a train of n equally spaced pulses per revolution of the drill string and pulses from this pulse-train are used to control the integration of the sensor output (gravity or magnetic) over 4 successive quarter periods of rotation of the drill string. If one pulse $P_O$ of the pulse train is arbitrarily chosen at some time to the repeated pulses $P_{n/4}$, $P_{n/2}$ and $P_{3n/4}$ define times $t_0+T/4$, $t_0+T/2$ and $t_o+3T/4$ respectively where the period of rotation $T=2\pi/W$.

3. Sensor Output Integrations

With the sensor output(s) written as $$Vx(t)=V.\cos(W.t)+Vk$$

consider the integration of Vx(t) from any initial time $t_i$ to $t_i+T/4$ $$Q = \int_{t_i}^{t_i+T/4} V \cdot \cos(W \cdot t) \cdot dt + \int_{t_i}^{t_i+T/4} Vk \cdot dt$$

Thus, $$Q = [(V/W) \cdot \sin(W \cdot t)]_{t_i}^{t_i+T/4} + Vk \cdot T/4$$

or $$Q=(V/W).[\sin(W.t_i+W.T/4)-\sin(W.ti)]+K$$

or $$Q=(V/W).[\sin(W.t_i+\pi/2)-\sin(W.t_i)]+K$$

or $$Q=(V/W).[\cos(W.t_i)-\sin(W.t_i)]+K \qquad \text{(i)}$$

Where K is a constant=Vk.T/4

Using equation (i), the integration of Vx(t) from time $t_0$ to time $t_0=T/4$ yields $$Q1=(V/W).[\cos(W.t_0-\sin(W.t_0]+K \qquad \text{(ii)}$$

Using equation (i), the integration of Vx(t) from time $t_0+T/4$ to time $t_0+T/2$ yields $$Q2=(V/W).[\cos(W.t_0+W.T/4)-\sin(W.t_0+W.T/4)]+K$$

or $$Q2=(V/W).[\cos(W.t_0+\pi/2)-\sin(W.t_0+\pi/2)]+K$$

or $$Q2=(V/W).[-\sin(W.t_0)-\cos(W.t_0)]+K \qquad \text{(iii)}$$

Using equation(i), the integration of Vx(t) from time $t_0+T/2$ to time $t_0+3T/4$ yields $$Q3=(V/W).[\cos(W.t_0+W.T/2)-\sin(W.t_0+W.T/2)]+K$$

or $$Q3=(V/W).[\cos(W.t_0+\pi)-\sin(W.t_0+\pi)]+K$$

or $$Q3=(V/W).[-\cos(W.t_0)+\sin(W.t_0)]+K \qquad \text{(iv)}$$

Using equation (i), the integration of Vx(t) from time $t_0+3T/4$ to time $t_0+T$ yields $$Q4=(V/W).[\cos(W.t_0)+W.3T/4)-\sin(W.t_0+W.3T/4)]+K$$

or $$Q4=(V/W).[\cos(W.t_0+3\pi/2)-\sin(W.t_0+3\pi/2)]+K$$

or $$Q4=(V/W).[\sin(W.t_0)+\cos(W.t_0)]+K \qquad \text{(v)}$$

Writing $K1=V/W$ and $\alpha=W.t_0$ then equations (ii) through (v) yield for the four successive integrations of Vx(t)

$$Q1=-K1.\sin\alpha+K1.\cos\alpha+K \qquad \text{(vi)}$$

$$Q2=-K1.\sin\alpha-K1.\cos\alpha+K \qquad \text{(vii)}$$

$$Q3-K1.\sin\alpha-K1.\cos\alpha+K \qquad \text{(viii)}$$

$$Q4=+K1.\sin\alpha+K1.\cos\alpha+K \qquad \text{(ix)}$$

4. Rotation Angles

Equations (vi) through (ix) can be solved to yield angle $\alpha$; there is a degree of redundancy in the possible solutions but, for example, $$Q1-Q2=2K1.\cos\alpha$$

and $$Q3-Q2=2K1.\sin\alpha$$

or $$\sin\alpha/\cos\alpha=(Q3-Q2)/(Q1-Q2) \qquad \text{x)}$$

Since $\alpha=W.t_0$, the angle SG ($t_0$) between (OX) and {Gxy} at time $t_0$ can be determined from the calculations above when the sensor output Vx(t)=Vgx(t), the accelerometer output, and the angle SB ($t_0$) between (OX) and {Bxy} can be determined from the calculations when Vx(t)=Vbx(t) the fluxgate output.

The angle between (OX) and {Gxy} at any time $t_m$ measured from the arbitrary starting time $t_0$ which is determined by Pulse $P_0$ is $$SG(t_m)=SG(t_o)+W.t_m=sG(t_0)+(2.\pi).t_m/T \qquad \text{(xi)}$$

The angle between (OX) and {Bxy} at any time $t_m$ measured from the arbitrary starting time to which is determined by pulse $P_0$ is $$SB(t_m)=SB(t_0)+W.t_m=SB(t_0)+(2.\pi).t_m/T \qquad \text{(xii)}$$

Note:

Conventionally, the Gravity Steering Angle (High Side Angle) is measured with respect to the $-\{Gxy\}$ direction and is thus at time $t_m$ given by $$HS(t_m)=\pi+SG(t_m)$$

5. Cross-axes Vector Magnitudes

Equations (vi) through (ix) can be solved to yield the constant K $$K=(Q1+Q2+Q3+Q4)/4 \qquad \text{(xiii)}$$

and the constant K1 can be determined from $$(K1)^2=[(Q1-K)^2+(Q2-K)^2]/2=[(Q3-K)^2+(Q4-K)^2]/2 \qquad \text{(xiv)}$$

Thus V=K1.W can be determined.

If the constant K1=K1G for the accelerometer calculations and constant K1=K1B for the fluxgate calculations then Vg=K1G.W and Vb=K1B.W Thus, the magnitude of the cross-axis gravity component can be calculated as $$Gxy=Vg/SFG \qquad \text{(xv)}$$

And the magnitude of the cross-axis magnetic flux component can be calculated as $$Bxy=Vb/SFB \qquad \text{(xvi)}$$

6. Inclination

If the Accelerometer along the hole axis direction (OZ) yields the value of the gravity component Gz(t), then with Gz(t)=Gz essential constant, the inclination survey angle (INC) can be determined from $$\sin(INC)/\cos(INC)=Gxy/Gz \qquad \text{(xvii)}$$

7. Magnetic Azimuth and Dip

Figure 3:
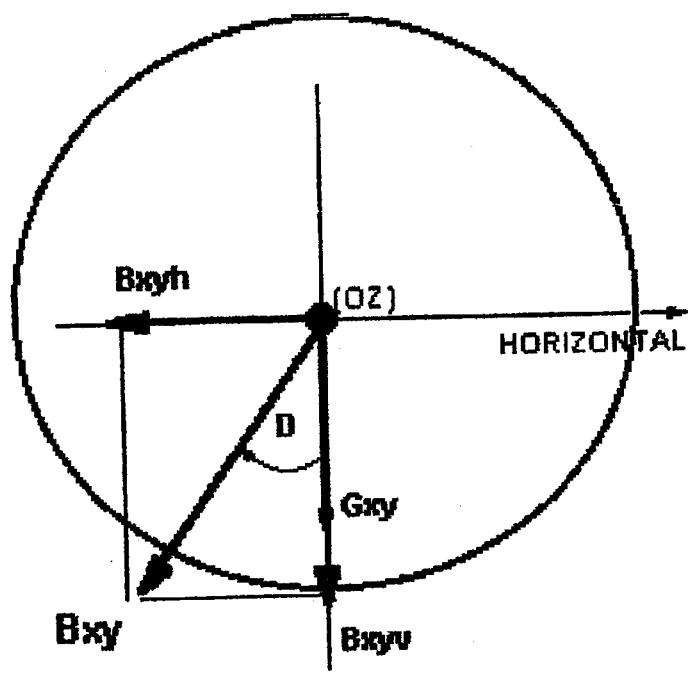
FIG. 3 is a cross-section of a borehole showing magnetic flux components.

Calculations are carried out sequentially to determine the Magnetic Azimuth Survey Angle (AZ) and the Magnetic Dip Angle (DIP) as follows:

With reference to the FIGS. 1 and 3, the angle D between Gxy and Bxy is determined as $SG(t_0)-SB(t_0)$ (or $SG(t_m)-SB(t_m)$).

In the section across the hole, $\{Bxy\}$ is resolved into a horizontal component $\{Bxyh\}$ and a component $\{Bxyv\}$ in the vertical plane containing the hole axis (OZ) with $$Bxyh=Bxy.\sin(D)$$

and $$Bxyv=Bxy.\cos(D)$$

Figure 4:
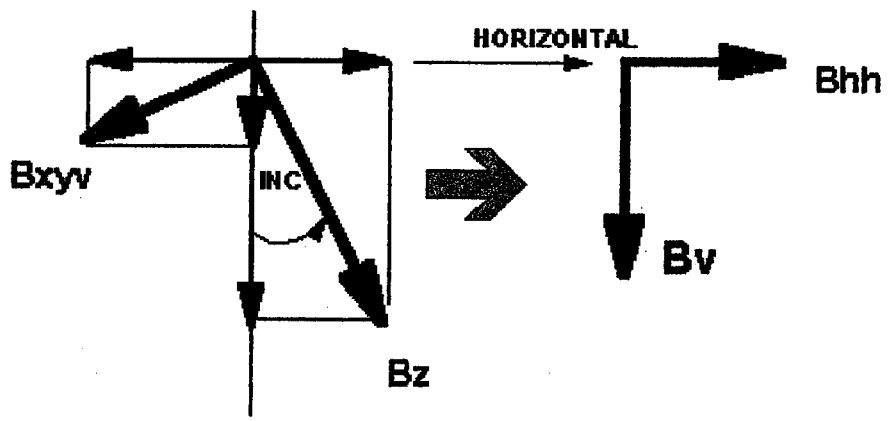
FIG. 4 shows a vertical plane taken through a horizontal borehole, showing magnetic flux components.

With reference to FIG. 4 and with the Fluxgate along axis (OZ) yielding Bz(t)=Bz essentially constant, $\{Bz\}$ and $\{Bxyv\}$ can be resolved in the vertical plane containing a hole axis (OZ) into a horizontal component $\{Bhh\}$ and a vertical component $\{Bv\}$ with $$Bhh=Bz.\sin(INC)-Bxyv.\cos(INC)$$

and $$Bv=Bz.\cos(INC)+Bxyv.\sin(INC) \qquad \text{(xviii)}$$

Figure 5:
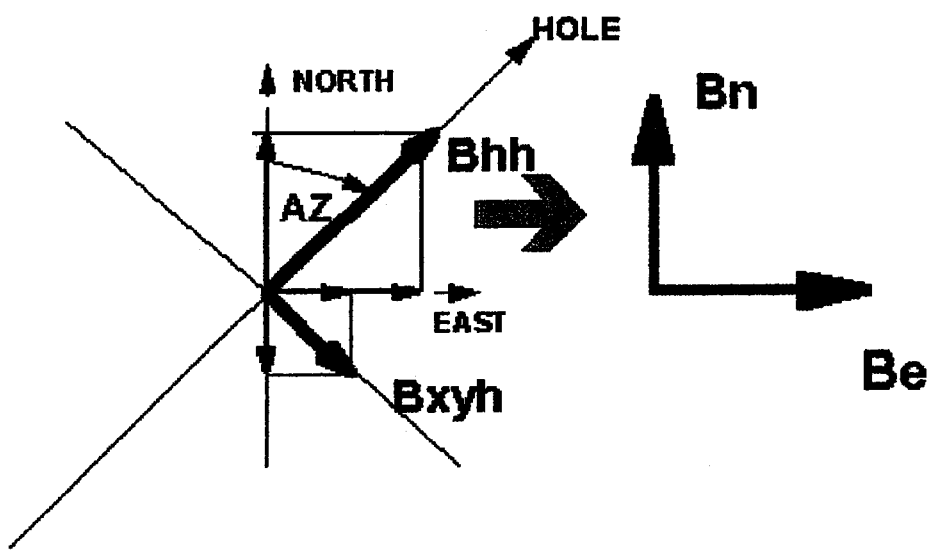
FIG. 5 shows a horizontal plane through the same borehole.

With reference to FIG. 5, $\{Bhh\}$ and $\{Bxyh\}$ can be resolved in the horizontal plane into components $\{Bn\}$ in direction North and $\{Be\}$ in direction East with $$Bn=Bhh.\cos(AZ)-Bxyh.\sin(AZ) \qquad \text{(xix)}$$

and $$Be=Bhh.\sin(AZ)+Bxyh.\cos(AZ) \qquad \text{(xx)}$$

Since Be=0, the Magnetic Azimuth can be calculated from $$\sin(AZ)/\cos(AZ)=-Bxyh/Bhh \qquad \text{(xxi)}$$

The local Magnetic Dip Angle can be calculated from $$\sin(DIP)/\cos(DIP)=Bv/Bn \qquad \text{(xxii)}$$

SUMMARY

The invention thus provides a means of deriving borehole survey data from a rotating drill string. It also allows the data to be produced from sets of two sensors, rather than three.

Figure 6:
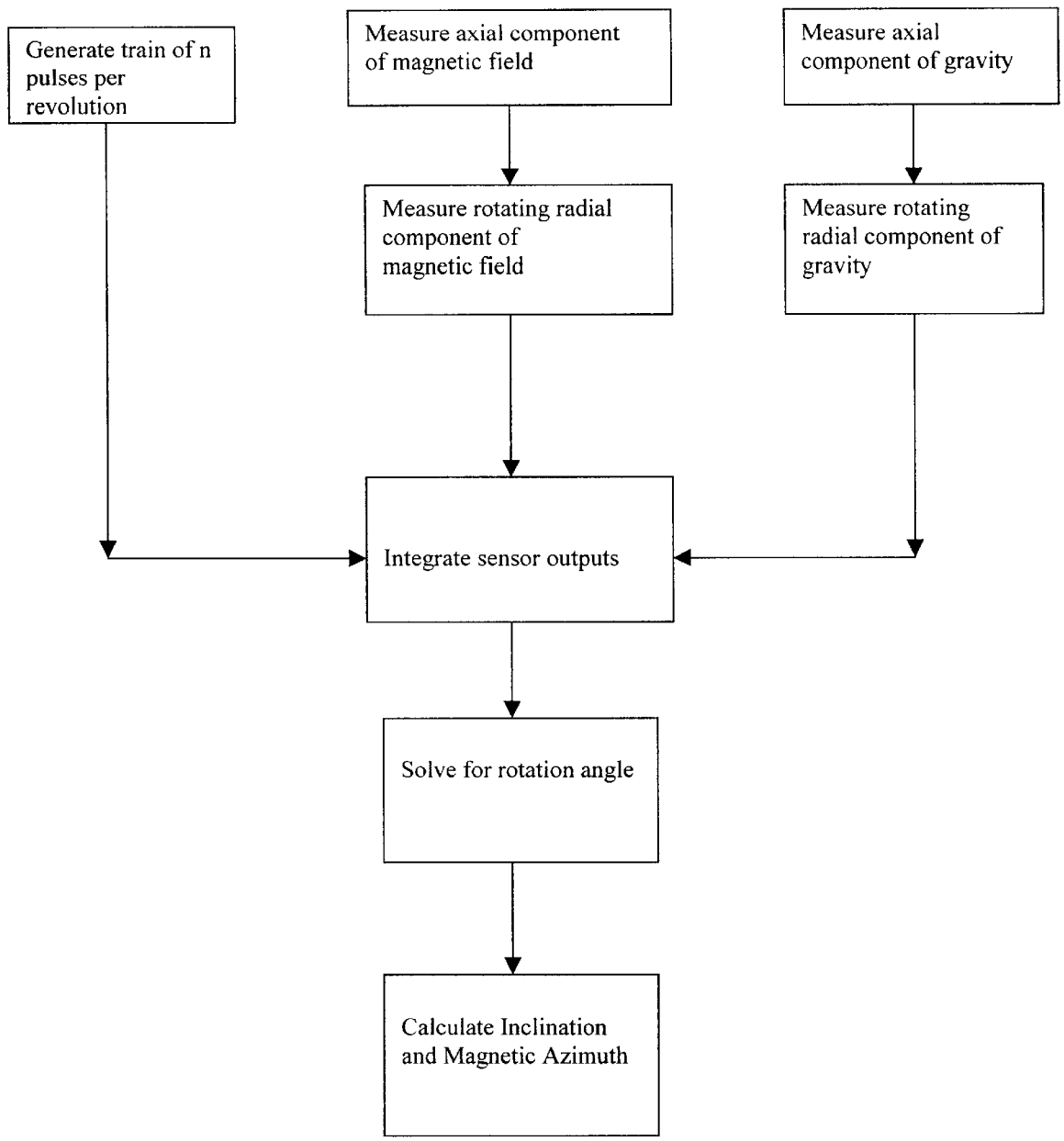
FIG. 6 is a flow chart illustrating one form of the method of the invention.

FIG. 6 summarises the foregoing in flowchart form for a preferred implementation of the method of the present invention.

Modifications may be made to the foregoing embodiment within the scope of the invention. For example, the two transverse sensors could be arranged along different radii provided the angle between them is known.

What is claimed is:

1. A method of determining the orientation of a borehole in which at least one parameter selected from gravity and magnetic flux is measured; the method comprising passing a sensor assembly along the borehole; rotating the sensor assembly; deriving from the sensor assembly, for the or each selected parameter, measurements of a first parameter component along the borehole axis and a second parameter component along an axis which is transverse to the borehole axis and rotates thereabout with rotation of the sensor assembly; and calculating, for the or each selected parameter, from the first and second parameter components the value of one or more desired orientation angles; and wherein said calculation comprises deriving for each revolution of the sensor assembly a train of a given number of equally spaced pulses, and using said pulse train to control integration of one or both of the gravity and magnetic flux signals over successive portions of each revolution.

2. A method according to claim 1, in which the or each transverse axis is at 90 degrees to the borehole axis.

3. A method according to claim 1, in which both gravity and magnetic flux are measured.

4. A method according to claim 3, in which the orientation angles produced are azimuth and inclination.

5. A method according to claim 4, in which the local magnetic dip angle is also calculated.

6. A method according to claim 1, in which said portions are quarter revolutions.

7. A method according to claim 1, in which said integration produces a set of simultaneous equations which are solved to derive the orientation angles.

8. A method according to claim 7, in which said simultaneous equations are equations (vi) to (ix) as follows:

$$Q1=-K1.\sin\alpha+K1.\cos\alpha+K \qquad \text{(vi)}$$

$$Q2=-K1.\sin\alpha-K1.\cos\alpha+K \qquad \text{(vii)}$$

$$Q3=-K1.\sin\alpha-K1.\cos\alpha+K \qquad \text{(viii)}$$

$$Q4=+K1.\sin\alpha+K1.\cos\alpha+K. \qquad \text{(ix)}$$

9. Apparatus for determining the orientation of a borehole, comprising a sensor assembly adapted to be incorporated in a rotating drill string; the sensor assembly being capable of measuring at least one parameter selected from gravity and magnetic flux; the sensor assembly comprising, for the or each selected parameter, a first sensor having a detection axis arranged along the axis of the drill string for measuring an axial component of the parameter to provide an axial component signal, and a second sensor having a detection axis arranged transversely to the drill string axis for measuring a transverse parameter component in a direction which, in use, rotates with the drill string to provide a transverse component signal; and a calculator operable to calculate from said component signals the value of one or more desired orientation angles by deriving for each revolution of the sensor assembly a train of a given number of equally spaced pulses, and using said pulse train to control integration of one or both of the gravity and magnetic flux signals over successive portions of each revolution.

10. Apparatus according to claim 9, including first and second gravity sensors and first and second magnetic flux sensors.

11. Apparatus according to claim 10, in which said calculator is operable to calculate azimuth and inclination.

12. Apparatus according to claim 10, in which said second sensors have their detection axes arranged at 90° to the drill string axis.

13. Apparatus according to claim 9, wherein said portions are quarter revolutions.

14. Apparatus according to claim 9, wherein said integration produces a set of simultaneous equations which are solved to derive the orientation angles.

15. Apparatus according to claim 14, wherein said simultaneous equations are equations (vi) to (ix) as follows:

$$Q1 = +K1.\sin\alpha + K1.\cos\alpha + i\,K \quad \text{(vi)}$$

$$Q2 = -K1.\sin\alpha - K1.\cos\alpha + K \quad \text{(vii)}$$

$$Q3 = -K1.\sin\alpha - K1.\cos\alpha + K \quad \text{(viii)}$$

$$Q4 = +K1.\sin\alpha + K1.\cos\alpha + K. \quad \text{(ix)}$$

* * * * *